(No Model.)
D. C. LOCKWOOD.
MARTINGALE RING OF CELLULOID OR OTHER PLASTIC MATERIAL.
No. 276,435. Patented Apr. 24, 1883.
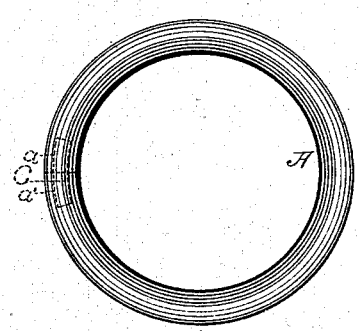
WITNESSES —
Chas. C. Gill
Herman Gustow
INVENTOR —
David C. Lockwood,
By his Attorney
Rowland Cox.

UNITED STATES PATENT OFFICE.

DAVID C. LOCKWOOD, OF NEWARK, N. J., ASSIGNOR TO THE RUBBER AND CELLULOID HARNESS TRIMMING COMPANY, OF SAME PLACE.

MARTINGALE-RING OF CELLULOID OR OTHER PLASTIC MATERIAL.

SPECIFICATION forming part of Letters Patent No. 276,435, dated April 24, 1883.

Application filed November 28, 1882. (No model.)

*To all whom it may concern:*

Be it known that I, DAVID C. LOCKWOOD, a citizen of the United States, residing at Newark, in the county of Essex and State of New Jersey, have invented certain new and useful Improvements in Martingale-Rings of Celluloid or other Plastic Material; and I do hereby declare the following to be a full, clear, and exact description of the invention, such as will enable others skilled in the art to which it appertains to make and use the same, reference being had to the accompanying drawings, in which—

Figure 1 shows a perspective view of a blank, and Fig. 2 the finished ring.

The invention has relation to improvements in the manufacture of articles of plastic material, and is especially adapted to the production of what are known as "martingale-rings." I contemplate its use particularly in connection with articles made of compounds of pyroxyline, and especially the article known as "celluloid," which I have used with the best results.

The invention consists essentially in utilizing a piece or section of rod of such length that it will form, when its ends are united, a ring of the desired diameter.

In the accompanying drawings the nature of the invention is clearly illustrated.

A is a section or piece of rod, which will be formed in any convenient way. At its ends are formed the holes or apertures $a$ $a'$, which are of a suitable size and shape to accommodate the dowel-pin C. The pin C is introduced into the hole or aperture $a$, after which the piece of rod is bent and the projecting end of the dowel-pin introduced into the hole or aperture $a'$, after which the ring is completed by means of a die or mold in the customary manner.

The invention is particularly useful in connection with the manufacture of rings from compounds of pyroxyline, although it may be used in the production of rings from other plastic material.

The dowel-pin may be made of the same material as the ring or other materials, according to circumstances, although, as stated, I prefer to use a pin of the same material as that out of which the article is made.

In certain Letters Patent granted to me on the 20th day of December, 1881, and which are numbered 251,258 and 251,259, I have described certain methods of manufacturing hollow and solid rings of plastic material, to the former of which methods the present invention is analogous, the principal difference being that in the present instance I make use of a solid rod and produce a solid ring by so manipulating the section of rod that I am enabled to effect the desired result very much in the same manner as is described in the patents last aforesaid.

In my present invention I take a rod of plastic material of any appropriate size, which I cut into sections of such length that when the ends are united they will form a ring of the desired diameter. I then provide the ends of the pieces of rod with suitable holes or apertures, in one of which a dowel-pin, preferably of the same material as the ring, is introduced, being of a sufficient length to operate to hold the ends of the section of rod securely together after the material has been subjected to the action of the mold. The dowel-pin having been introduced, the blank or section of rod is manipulated to form a ring, the dowel-pin being introduced into the hole or aperture in the opposite end of the blank or section of rod. The partially-formed ring is then introduced into a die or mold of appropriate construction and the ring completed by heat and pressure, according to methods well understood in the art to which the invention relates. After the ring has been left in the die sufficiently long to have become thoroughly set, it is removed and placed upon a hub and permitted to dry, when it will be found to have all the characteristics of a perfectly solid ring.

In practicing the invention the material will be by preference manipulated while it is in a semi-plastic condition, as considerable inconvenience will be experienced if it is permitted to harden.

What I claim as my invention is—

The process herein described of forming solid rings of plastic material, which consists in, first, forming a section of rod of such length that it will form when its ends are united a ring of any given diameter; second, providing the ends of the rod with holes to accommodate a dowel-pin; third, introducing a dowel-pin and manipulating the section of rod to form an unfinished ring; fourth, finishing the ring in a die, substantially as set forth.

In testimony whereof I affix my signature in presence of two witnesses.

DAVID C. LOCKWOOD.

Witnesses:
CHAS. C. GILL,
HERMAN GUSTOW.